US011483865B2

United States Patent
Ko et al.

(10) Patent No.: US 11,483,865 B2
(45) Date of Patent: Oct. 25, 2022

(54) WIRELESS COMMUNICATION METHOD AND WIRELESS COMMUNICATION TERMINAL FOR SPATIAL REUSE OPERATION

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Gyeonggi-do (KR); Juhyung Son, Gyeonggi-do (KR); Woojin Ahn, Gyeonggi-do (KR); Jinsam Kwak, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/113,026

(22) Filed: Dec. 5, 2020

(65) Prior Publication Data
US 2021/0092770 A1    Mar. 25, 2021

Related U.S. Application Data

(63) Continuation of application No. 16/219,937, filed on Dec. 13, 2018, now Pat. No. 10,873,973, which is a
(Continued)

(30) Foreign Application Priority Data

Jun. 14, 2016 (KR) .................. 10-2016-0074091
Jul. 7, 2016 (KR) .................. 10-2016-0086044

(51) Int. Cl.
H04W 74/08 (2009.01)
H04W 40/00 (2009.01)
(Continued)

(52) U.S. Cl.
CPC ....... *H04W 74/0808* (2013.01); *H04W 40/00* (2013.01); *H04W 72/0446* (2013.01);
(Continued)

(58) Field of Classification Search
None
See application file for complete search history.

(56) References Cited

U.S. PATENT DOCUMENTS 8,483,741 B1    7/2013  Hussain et al.
10,128,966 B1  11/2018  Chu et al.
(Continued)

FOREIGN PATENT DOCUMENTS

CN    104321998    1/2015
CN    104853375    8/2015
(Continued)

OTHER PUBLICATIONS

Notice of Allowance dated Jun. 3, 2021 for U.S. Appl. No. 16/812,375 (published as US 2020/0213860).
(Continued)

*Primary Examiner* — Diane L Lo
(74) *Attorney, Agent, or Firm* — Ladas & Parry, LLP

(57) ABSTRACT

The present invention relates a wireless communication method and a wireless communication terminal for supporting a spatial reuse operation of an overlapping basic service set to efficiently use a wireless resource. To this end, provided are a base wireless communication terminal including: a processor; and a communication unit, wherein the processor receives a PHY protocol data unit (PPDU) through the communication unit, determines whether the PPDU contains an intra-BSS frame or contains an inter-BSS frame based on preamble information of the PPDU, and performs either a first operation or a second operation
(Continued)

distinct from each other according to a determination result and a wireless communication method using the same.

16 Claims, 12 Drawing Sheets

Related U.S. Application Data continuation of application No. PCT/KR2017/006211, filed on Jun. 14, 2017.

(51) Int. Cl.
  *H04W 72/04* (2009.01)
  *H04W 84/12* (2009.01)
  *H04W 88/08* (2009.01)
  *H04W 80/02* (2009.01)

(52) U.S. Cl.
  CPC ........... *H04W 74/08* (2013.01); *H04W 84/12* (2013.01); *H04W 88/08* (2013.01); *H04W 80/02* (2013.01)

(56) References Cited

U.S. PATENT DOCUMENTS

| | | | |
|---|---|---|---|
| 10,542,526 | B2 | 1/2020 | Seok |
| 2012/0155350 | A1 | 6/2012 | Wentink et al. |
| 2012/0157151 | A1 | 6/2012 | Chu et al. |
| 2014/0307726 | A1 | 10/2014 | Kang et al. |
| 2015/0078299 | A1 | 3/2015 | Barriac et al. |
| 2015/0103767 | A1 | 4/2015 | Kim et al. |
| 2015/0110093 | A1 | 4/2015 | Asteijadhi et al. |
| 2015/0282043 | A1 | 10/2015 | Fang et al. |
| 2016/0050691 | A1 | 2/2016 | Jauh et al. |
| 2016/0249366 | A1 | 8/2016 | Seok |
| 2016/0330788 | A1 | 11/2016 | Zheng et al. |
| 2016/0353275 | A1 | 12/2016 | Liu et al. |
| 2016/0374087 | A1 | 12/2016 | Liu et al. |
| 2017/0006541 | A1* | 1/2017 | Huang ................. H04W 74/006 |
| 2017/0094685 | A1* | 3/2017 | Noh ................. H04W 74/0816 |
| 2017/0164371 | A1 | 6/2017 | Kim et al. |
| 2017/0188376 | A1 | 6/2017 | Noh et al. |
| 2017/0201981 | A1 | 7/2017 | Huang et al. |
| 2017/0230981 | A1* | 8/2017 | Ryu ...................... H04W 74/00 |
| 2017/0289819 | A1 | 10/2017 | Kim et al. |
| 2017/0289987 | A1* | 10/2017 | Seok ...................... H04W 74/00 |
| 2017/0295560 | A1 | 10/2017 | Kim et al. |
| 2018/0014327 | A1 | 1/2018 | Park |
| 2018/0146426 | A1 | 5/2018 | Park |
| 2018/0146469 | A1 | 5/2018 | Luo et al. |
| 2018/0220456 | A1 | 8/2018 | Kim et al. |
| 2018/0227952 | A1* | 8/2018 | Kim ................. H04W 74/0816 |
| 2018/0317170 | A1 | 11/2018 | Cariou |
| 2018/0317173 | A1 | 11/2018 | Kim et al. |
| 2018/0359807 | A1 | 12/2018 | Kim et al. |
| 2019/0028898 | A1 | 1/2019 | Ko et al. |
| 2019/0132872 | A1 | 5/2019 | Ko et al. |
| 2019/0261419 | A1 | 8/2019 | Noh et al. |
| 2019/0306824 | A1 | 10/2019 | Chu et al. |
| 2019/0327741 | A1 | 10/2019 | Li et al. |

FOREIGN PATENT DOCUMENTS

| | | |
|---|---|---|
| EP | 1 307 061 | 5/2003 |
| EP | 2 230 807 | 9/2010 |
| KR | 10-2013-0005289 | 1/2013 |
| KR | 10-2014-0023850 | 2/2014 |
| KR | 10-2014-0035841 | 3/2014 |
| KR | 10-2014-0036295 | 3/2014 |
| KR | 10-2014-0097160 | 8/2014 |
| KR | 10-2014-0130113 | 11/2014 |
| KR | 10-2015-0020106 | 2/2015 |
| KR | 10-2015-0052798 | 5/2015 |
| KR | 10-2015-0054625 | 5/2015 |
| KR | 10-1517321 | 5/2015 |
| KR | 10-2015-0073855 | 7/2015 |
| KR | 10-1534865 | 7/2015 |
| KR | 10-1553857 | 9/2015 |
| KR | 10-1558112 | 10/2015 |
| KR | 10-1561117 | 10/2015 |
| KR | 10-2016-0006235 | 1/2016 |
| KR | 10-2016-0018351 | 2/2016 |
| KR | 10-2016-0019383 | 2/2016 |
| KR | 10-2016-0019867 | 2/2016 |
| KR | 10-2016-0028974 | 3/2016 |
| KR | 10-2016-0034853 | 3/2016 |
| KR | 10-2016-0004950 | 4/2016 |
| KR | 10-2016-0047405 | 5/2016 |
| KR | 10-1632894 | 6/2016 |
| KR | 10-2019-0105666 | 9/2019 |
| KR | 10-2019-0112193 | 10/2019 |
| KR | 10-2020-0033915 | 3/2020 |
| KR | 10-2121049 | 6/2020 |
| KR | 10-2021-0110403 | 9/2021 |
| KR | 10-2021-0158886 | 12/2021 |
| KR | 10-2344180 | 12/2021 |
| WO | 2013/130793 | 9/2013 |
| WO | 2015/060514 | 4/2015 |
| WO | 2015/081169 | 6/2015 |
| WO | 2015/112780 | 7/2015 |
| WO | 2015/120488 | 8/2015 |
| WO | 2016/023492 | 2/2016 |
| WO | 2016/029876 | 3/2016 |
| WO | 2016/036138 | 3/2016 |
| WO | 2016/040837 | 3/2016 |
| WO | 2016/087917 | 6/2016 |
| WO | 2017/012182 | 1/2017 |
| WO | 2017/171531 | 10/2017 |
| WO | 2017/217767 | 12/2017 |

OTHER PUBLICATIONS

Notice of Allowance dated Apr. 8, 2021 for U.S. Appl. No. 16/812,375 (published as US 2020/0213860).

International Search Report for PCT/KR2016/012615 dated Feb. 28, 2017 and its English translation from WIPO (now published as WO 2017/078442).

Written Opinion of the International Searching Authority for PCT/KR2016/012615 dated Feb. 28, 2017 and its English translation from WIPO (now published as WO 2017/078442).

International Preliminary Report on Patentability (Chapter I) for PCT/KR2016/012615 dated May 8, 2018 and its English translation from WIPO (now published as WO 2017/078442).

Notice of Allowance dated Dec. 11, 2019 for U.S. Appl. No. 16/141,973.

Notice of Allowance dated Dec. 11, 2019 for U.S. Appl. No. 16/141,977.

Notice of Allowance dated Jan. 4, 2021 for Korean Patent Application No. 10-2020-7018342 and its English translation provided by Applicant's foreign counsel.

Office Action dated Jan. 25, 2021 for Chinese Patent Application No. 201680063960.X and its English translation provided by Applicant's foreign counsel.

Office Action dated Mar. 16, 2021 for Korean Patent Application No. 10-2018-7036233 and its English translation provided by Applicant's foreign counsel.

Rossi Jun Luo et al.: "OBSS NAV and PD Threshold Rule for Spatial Reuse", 802.11-15/1109r1, Sep. 13, 2015, Slides 1-20.

Office Action dated May 20, 2021 for Korean Patent Application No. 10-2021-7010350 and its English translation provided by Applicant's foreign counsel.

International Search Report for PCT/KR2017/006211 dated Sep. 15, 2017 and its English translation from WIPO (now published as WO 2017/217767).

Written Opinion of the International Searching Authority for PCT/KR2017/006211 dated Sep. 15, 2017 and its English translation by Google Translate (now published as WO 2017/217767).

Wilus, "Issues on BSS Color Bits Collision", doc: IFEF. 802.11-16/0396r0, slide. 1-18, Mar. 14, 2016, see slides 2, 6, 10, 18.

(56) References Cited

OTHER PUBLICATIONS

Huawei et al., "Discussions on Spatial Reuse Operations in 11ax", doc: IEEE 802.11/0382r0, slide. 1-18, Mar. 14, 2016, see slide 12.
Office Action dated Jun. 28, 2019 for U.S. Appl. No. 15/968,681 (now published as US 2018/0249501).
International Preliminary Report on Patentability (Chapter I) dated Dec. 18, 2018 for PCT/KR2017/006211 and its English translation from WIPO.
Notice of Allowance dated Mar. 23, 2020 for Korean Patent Application No. 10-2018-7027723 and its English translation provided by Applicant's foreign counsel.
Notice of Allowance dated Apr. 23, 2020 for U.S. Appl. No. 15/968,681.
Notice of Allowance dated Jul. 3, 2020 for Korean Patent Application No. 10-2020-7018343 and its English translation provided by Applicant's foreign counsel.
Office Action dated Jul. 3, 2020 for Korean Patent Application No. 10-2020-7018342 and its English translation provided by Applicant's foreign counsel.
Notice of Allowance dated Aug. 19, 2020 for U.S. Appl. No. 16/219,937 (now published as US 2019/0132872).
Final Office Action dated May 4, 2020 for U.S. Appl. No. 16/219,937 (now published as US 2019/0132872).
Office Action dated Jan. 22, 2020 for U.S. Appl. No. 16/219,937 (now published as US 2019/0132872).
Office Action dated Aug. 30, 2021 for Korean Patent Application No. 10-2018-7012484 and its English translation provided by Applicant's foreign counsel.
Office Action dated Oct. 18, 2021 for U.S. Appl. No. 17/113,029.
Office Action dated Sep. 16, 2021 for Chinese Patent Application No. 201780022351.4 and its English translation provided by Applicant's foreign counsel.
Notice of Allowance dated Sep. 23, 2021 for Korean Patent Application No. 10-2018-7036233 and its English translation provided by Applicant's foreign counsel.
Notice of Allowance dated Jan. 28, 2022 for Korean Patent Application No. 10-2021-7042355 and its English translation provided by Applicant's foreign counsel.
Notice of Allowance dated Feb. 3, 2022 for U.S. Appl. No. 16/942,765.
Notice of Allowance dated Feb. 8, 2022 for U.S. Appl. No. 16/942,764.
Final Office Action dated Feb. 22, 2022 for U.S. Appl. No. 17/113,029.
Office Action dated Mar. 11, 2022 for Korean Patent Application No. 10-2022-7006593 and its English translation provided by Applicant's foreign counsel.
Office Action dated Mar. 11, 2022 for Korean Patent Application No. 10-2022-7006595 and its English translation provided by Applicant's foreign counsel.
Office Action dated Mar. 25, 2022 for Korean Patent Application No. 10-2021-7010350 and its English translation provided by Applicant's foreign counsel.
Notice of Allowance dated May 5, 2022 for Chinese Patent Application No. 201780022351.4 and its English translation provided by Applicant's foreign counsel.
Notice of Allowance dated May 19, 2022 for Korean Patent Application No. 10-2021-7010350 and its English translation provided by Applicant's foreign counsel.
Office Action dated Jun. 7, 2022 for U.S. Appl. No. 17/113,029.
Notice of Allowance dated Jul. 8, 2022 for Korean Patent Application No. 10-2021-7042356 and its English translation provided by Applicant's foreign counsel.
Notice of Allowance dated Sep. 8, 2022 for Korean Patent Application No. 10-2022-7006593 and its English translation provided by Applicant's foreign counsel.
Notice of Allowance dated Sep. 8, 2022 for Korean Patent Application No. 10-2022-7006595 and its English translation provided by Applicant's foreign counsel.

\* cited by examiner

| PPDU type | Granularity |
|---|---|
| SU PPDU | 13.6 us |
| Extended range SU PPDU | 13.6 us |
| MU PPDU | 16 us |
| Trigger-based PPDU | 16 us |

WIRELESS COMMUNICATION METHOD AND WIRELESS COMMUNICATION TERMINAL FOR SPATIAL REUSE OPERATION

CROSS-REFERENCE TO RELATED APPLICATIONS

This application is a continuation of U.S. patent application Ser. No. 16/219,937 filed on Dec. 13, 2018, which is a continuation of International Patent Application No. PCT/KR2017/006211 filed on Jun. 14, 2017, which claims the priority to Korean Patent Application No. 10-2016-0074091 filed in the Korean Intellectual Property Office on Jun. 14, 2016, and Korean Patent Application No. 10-2016-0086044 filed in the Korean Intellectual Property Office on Jul. 7, 2016, the entire contents of which are incorporated herein by reference.

TECHNICAL FIELD

The present invention relates to a wireless communication method and a wireless communication terminal for a spatial reuse operation, and more particularly, to a wireless communication method and a wireless communication terminal for supporting a spatial reuse operation of an overlapping basic service set to efficiently use a wireless resource.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

The present invention has an object to prevent an uplink multi-user transmission process from being interrupted due to a spatial reuse operation of an inter-BSS terminal.

The present invention has an object to provide a wireless communication method and a wireless communication terminal in a high density environment including an overlapping basic service set.

Technical Solution

In order to achieve the objects, the present invention provides a wireless communication method and a wireless communication terminal as below.

First, an exemplary embodiment of the present invention provides a base wireless communication terminal, including a processor; and a communication unit, wherein the processor receives a PHY protocol data unit (PPDU) through the communication unit, determines whether the PPDU contains an intra-BSS frame or contains an inter-BSS frame based on preamble information of the PPDU, and performs either a first operation or a second operation distinct from each other according to a determination result.

In addition, an exemplary embodiment of the present invention provides a wireless communication method of a base wireless communication terminal, including: receiving a PHY protocol data unit (PPDU); determining whether the PPDU contains an intra-BSS frame or contains an inter-BSS frame based on preamble information of the PPDU; and performing either a first operation or a second operation distinct from each other according to a determination result.

When the PPDU is an high efficiency (HE) multi-user (MU) PPDU, the processor may determine whether the PPDU contains an intra-BSS frame or contains an inter-BSS frame based on information of a user specific field in HE-SIG-B of the PPDU.

If an AID indicated by a user field in the HE-SIG-B contains a value that is not assigned in a BSS of the base wireless communication terminal, the processor may determine that the PPDU contains an inter-BSS frame.

When the PPDU is an HE MU PPDU transmitted via an uplink, a STA-ID field of the user field in the HE-SIG-B of the PPDU may indicate an AID of a transmitter.

The processor may determine whether the PPDU contains an intra-BSS frame or contains an inter-BSS frame based on information of a BSS color field in HE-SIG-A of the PPDU.

The processor may determine whether the PPDU contains an intra-BSS frame or contains an inter-BSS frame based on at least one of information of a BSS color field in HE-SIG-A of the PPDU and information of a user specific field in HE-SIG-B of the PPDU, and when the PPDU satisfies both an intra-BSS condition and an inter-BSS condition, a determination based on the user specific field may take precedence over a determination based on the BSS color field.

The processor may determine whether the PPDU contains an intra-BSS frame or contains an inter-BSS frame based on at least one of information of a user specific field in HE-SIG-B of the PPDU and information of a MAC address field of a MAC frame contained in the PPDU, and when the PPDU satisfies both an intra-BSS condition and an inter-BSS condition, a determination based on the MAC address field may take precedence over a determination based on the user specific field.

When a received frame is determined as an intra-BSS frame, the processor may determine whether a channel is busy based on a first CCA threshold, and when the received frame is determined as an inter-BSS frame, the processor may determine whether the channel is busy based on both the first CCA threshold and a second CCA threshold which is distinct from the first CCA threshold.

When a received frame is determined as an intra-BSS frame, the processor may set or update a first network allocation vector (NAV), and when the received frame is determined as an inter-BSS frame, the processor may set or update a second NAV.

The second CCA threshold may have a value equal to or greater than the first CCA threshold.

Next, another exemplary embodiment of the present invention provides a wireless communication terminal, including a processor; and a communication unit, wherein the processor receives a PHY protocol data unit (PPDU) through the communication unit, obtains a TXOP duration value from a TXOP duration field in HE-SIG-A of the PPDU, and sets or updates a NAV based on the obtained TXOP duration value.

In addition, another exemplary embodiment of the present invention provides a wireless communication method of a wireless communication terminal, including: receiving a PHY protocol data unit (PPDU) through the communication unit; obtaining a TXOP duration value from a TXOP duration field in HE-SIG-A of the PPDU; and setting or updating a NAV based on the obtained TXOP duration value.

The TXOP duration field may contain a first bit field indicating a length of a TXOP and a second bit field indicating a granularity of a TXOP length.

The TXOP duration value may be determined based on a value obtained by multiplying the length of the TXOP obtained from the first bit field and the granularity of the TXOP length obtained from the second bit field.

Advantageous Effects

According to an embodiment of the present invention, if the received frame is determined as an inter-BSS frame, the spatial reuse operation can be performed, thereby efficiently using the wireless resources.

Further, according to an embodiment of the present invention, by restricting the spatial reuse operation in specific conditions, it is possible to prevent interference from occurring when STAs indicated by a trigger frame perform carrier sense.

According to an embodiment of the present invention, it is possible to increase the total resource utilization rate in the contention-based channel access system and improve the performance of the wireless LAN system.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2016-0074091 and 10-2016-0086044 filed in the Korean Intellectual Property Office and the embodiments and mentioned items described in the respective application, which forms the basis of the priority, shall be included in the Detailed Description of the present application.

Figure 1:
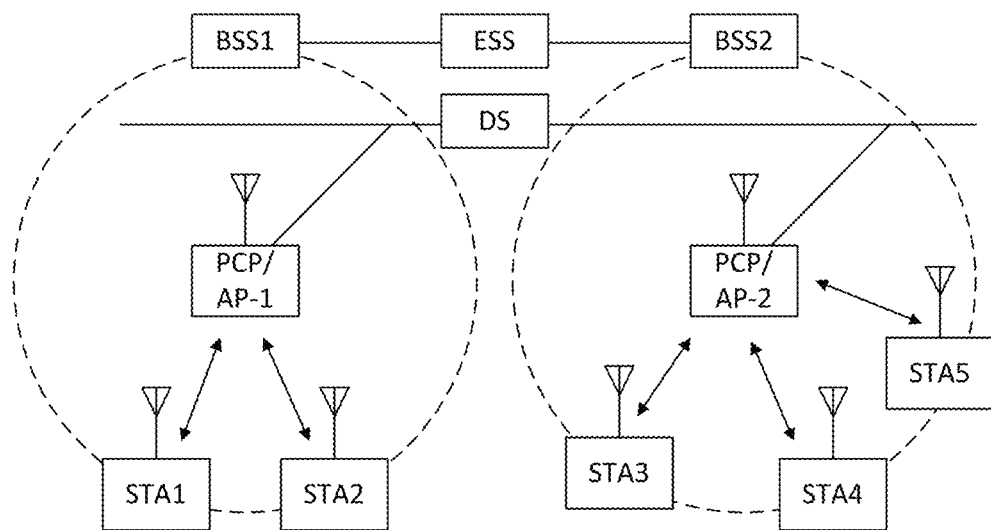
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
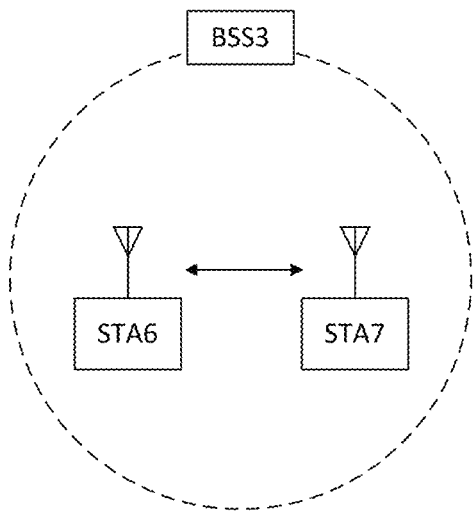
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
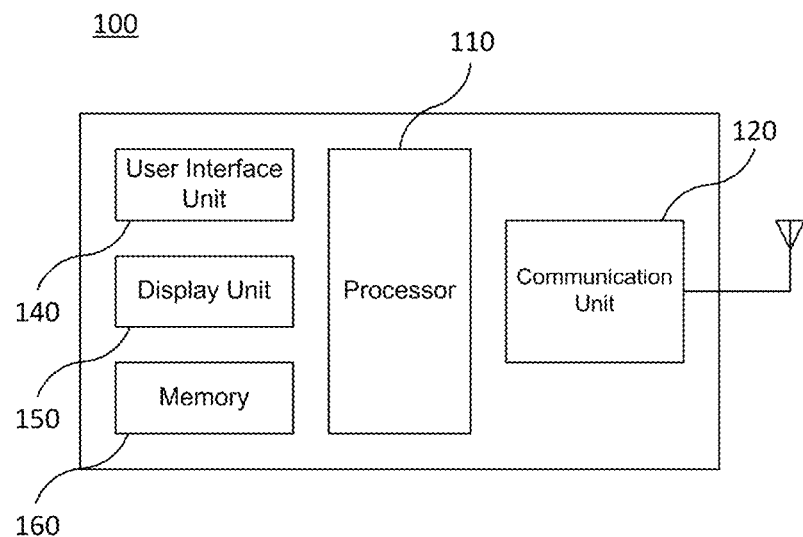
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, and 60 GHz. According to an embodiment, the station 100 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
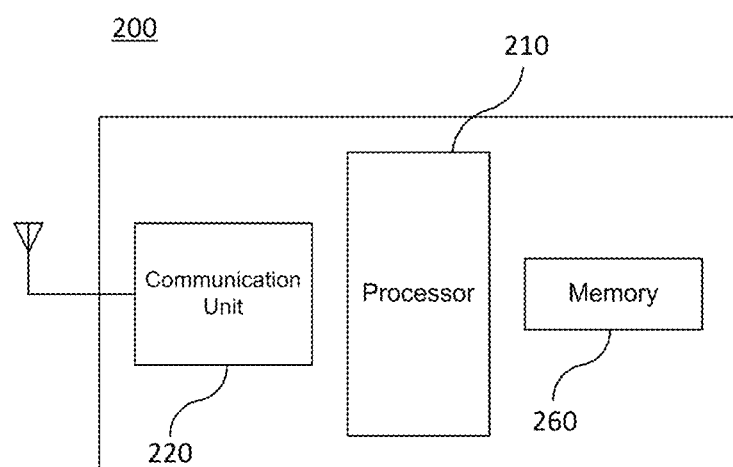
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, and 60 GHz together. Preferably, the AP 200 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
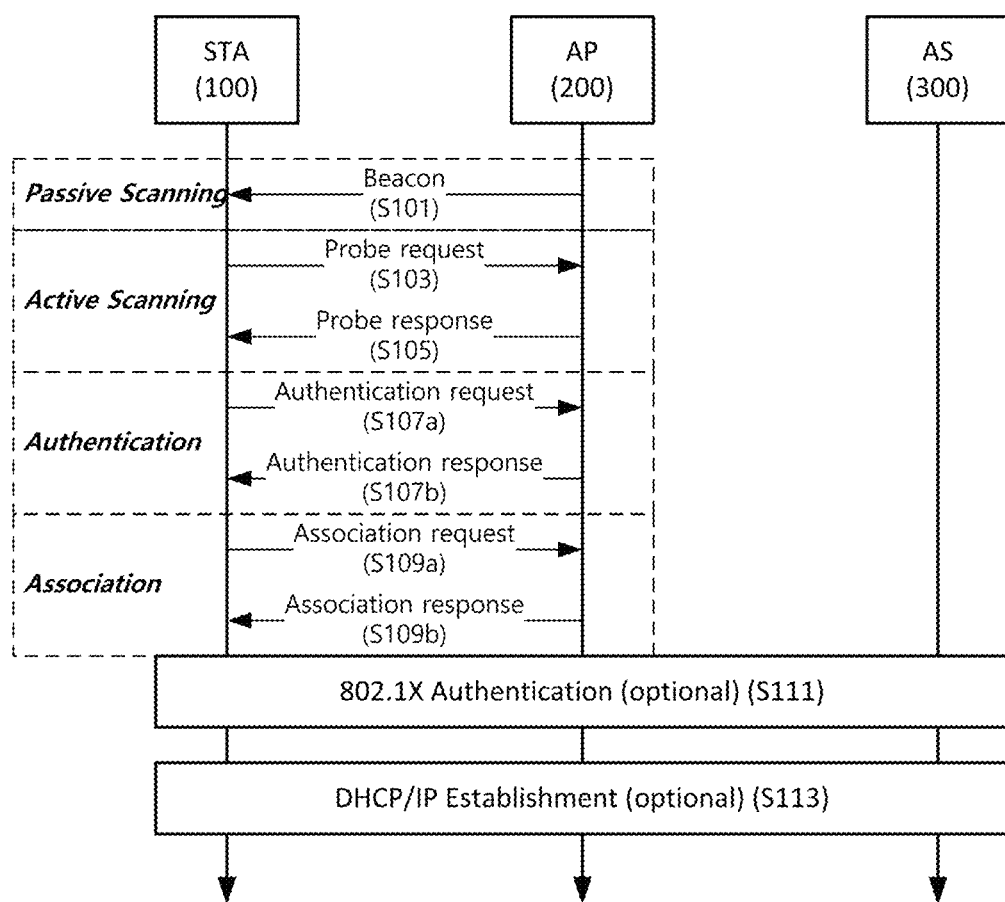
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Multi-User Transmission

When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a downlink multi-user (DL-MU) transmission in which an AP simultaneously transmits data to a plurality of STAs, and an uplink multi-user (UL-MU) transmission in which a plurality of STAs simultaneously transmit data to the AP may be performed.

Figure 6:
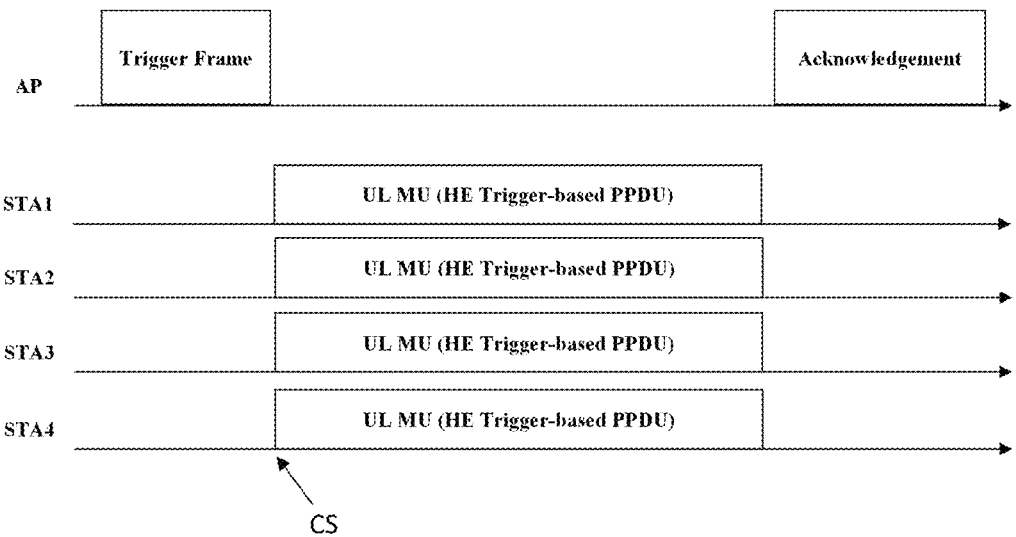
FIG. 6 illustrates an UL-MU transmission procedure according to an embodiment of the present invention.

FIG. 6 illustrates an UL-MU transmission procedure according to an embodiment of the present invention. In order to perform the UL-MU transmission, the channel to be used and the transmission start time of each STA that performs uplink transmission should be adjusted. According to an embodiment of the present invention, the UL-MU transmission process may be managed by the AP. The UL-MU transmission may be performed in response to a trigger frame transmitted by the AP. The trigger frame indicates a UL-MU transmission of one or more STAs. The STA indicated to perform UL-MU transmission by the trigger frame transmits a trigger-based PHY protocol data unit (PPDU) in response to the trigger frame. In this case, the STA may transmit the trigger-based PPDU a SIFS time after receiving the trigger frame. Further, the trigger frame may inform resource unit information, that is, channel or subchannel information allocated to each STA for transmitting the trigger-based PPDU. When the AP transmits a trigger frame, STAs indicated by the trigger frame transmit uplink data through each allocated resource unit. After the uplink data transmission is completed, the AP transmits an ACK to STAs that have successfully transmitted uplink data. In this case, the AP may transmit a predetermined multi-STA block ACK as an ACK for one or more STAs.

In the non-legacy wireless LAN system, a specific number, for example, 26, 52, or 106 tones may be used as a resource unit (RU) for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

According to an embodiment of the present invention, the trigger frame may be transmitted in various forms. According to an embodiment, the trigger frame may be transmitted in the form of aggregated MAC protocol data unit (A-MPDU) aggregated with other frames. When a trigger frame and another frame are aggregated to form an A-MPDU, the trigger frame may be located at the start of the corresponding A-MPDU. According to another embodiment, the trigger frame may be transmitted on a broadcast resource unit of a high efficiency (HE) MU PPDU. In this case, the trigger frame may not contain a user information field for a STA identified as a recipient of other resource unit or other spatial stream of the same HE MU PPDU.

According to the embodiment of the present invention, carrier sense (CS) may be required before the STAs respond to the trigger frame. At least one of a clear channel assessment (CCA) and a virtual carrier sense may be used as the carrier sense before responding to the trigger frame. The trigger frame may indicate through a CS required subfield whether carrier sense is required before the STAs respond to the trigger frame. If the CS required subfield of the trigger frame is set to 1, the STA considers the CCA state and virtual CS for a SIFS time between the trigger frame and the trigger-based PPDU transmitted in response thereto. In this case, the CCA to be performed may be a CCA-energy detect (ED). The STA performs the CCA-ED for one or more 20 MHz channels including the resource units to which the uplink transmission of the STA is allocated. When the channel on which the CCA-ED is performed is idle, the STA transmits a trigger-based PPDU through the allocated resource unit. However, when the channel on which the CCA-ED is performed is busy, the STA does not transmit the trigger-based PPDU. On the other hand, when the CS required subfield of the trigger frame is set to 0, the STA transmits the trigger-based PPDU regardless of the idle/busy state of the channel.

According to an embodiment of the present invention, a network allocation vector (NAV) in a virtual CS may be considered to respond to a trigger frame if at least one of the following conditions is not satisfied.

When a NAV is set by a frame of an AP that has transmitted a trigger frame

When a response transmitted by a triggered STA contains an ACK or a block ACK, and the length of the trigger-based PPDU is less than a threshold When a NAV is set by an intra-BSS frame When the CS required subfield of the trigger frame is set to 0

Other conditions

Spatial Reuse Operation

Due to the spread of mobile devices and the spread of wireless communication systems, terminals are increasingly communicating in a dense environment. In particular, the number of cases where a terminal communicates in an environment in which a plurality of BSSs are overlapped is increasing. When a plurality of BSSs are overlapped, communication efficiency of the terminal may be degraded due to interference with other terminals. In particular, if a frequency band is used through a contention procedure, the terminal may not be able to secure even a transmission opportunity due to interference with other terminals. To solve this problem, the terminal may perform the spatial reuse (SR) operation.

More specifically, the terminal may determine whether a frame is an intra-BSS frame or an inter-BSS frame based on information for identifying a BSS of a received frame. The information for identifying a BSS includes at least one of a BSS color, a partial BSS color, a partial AID, a STA-ID, or a MAC address. In the embodiment of the present invention, the non-legacy terminal may refer to a terminal that complies with the next generation wireless LAN standard (i.e., IEEE 802.11ax). Also, the intra-BSS frame indicates a frame transmitted from a terminal belonging to the same BSS, and the inter-BSS frame indicates a frame transmitted from a terminal belonging to an overlapping BSS (OBSS) or another BSS.

Various conditions can be used to determine whether the received frame is an intra-BSS frame or an inter-BSS frame. If a BSS color of the received frame is equal to a BSS color of a BSS of the terminal, the received frame is determined as an intra-BSS frame. Also, if a MAC address of the received frame is equal to a BSSID of the BSS of the terminal, the received frame is determined as an intra-BSS frame. Further, if the MAC address of the received frame is equal to one of BSSIDs in a multiple BSSID set to which a BSSID of the BSS of the terminal belongs, the received frame is determined as an intra-BSS frame. Here, the MAC address of the received frame includes at least one of a receiver address field, a transmitter address field, or a BSSID field of the frame. If the received frame does not satisfy the above listed conditions, the received frame may be determined as an inter-BSS frame.

Meanwhile, the determination results may be different in two or more intra/inter-BSS determination conditions. For example, the received frame may be determined as an intra-BSS frame under the determination condition based on the BSS color, but the received frame may be determined as an inter-BSS frame under the determination condition based on the MAC address. That is, the received frame may satisfy both the intra-BSS determination condition and the inter-BSS determination condition. In this case, the determination based on the MAC address may take precedence over the determination based on the other condition (i.e., the BSS color). That is, in the above example, the terminal may finally determine the received frame as an inter-BSS frame according to the determination condition based on the MAC address.

According to the embodiment of the present invention, the non-legacy terminal may perform different operations depending on whether the received frame is an intra-BSS frame. That is, when the received frame is determined as an intra-BSS frame, the terminal may perform the first operation. In addition, when the received frame is determined as an inter-BSS frame, the terminal may perform the second operation different from the first operation. According to an embodiment, the second operation performed by the terminal when the received frame is determined as an inter-BSS frame may be the SR operation. According to the embodiment of the present invention, the first operation and the second operation may be set in various ways.

According to an embodiment, the terminal may perform channel access based on different thresholds depending on whether the received frame is an intra-BSS frame. More specifically, when the received frame is determined as an intra-BSS frame, the terminal accesses the channel based on the first CCA threshold (i.e., the first operation). That is, the terminal performs a CCA based on the first CCA threshold, and determines whether the channel is busy based on a result of performing the CCA. On the other hand, when the received frame is determined as an inter-BSS frame, the terminal may access the channel based on the second CCA threshold (i.e., the second operation, or SR operation), which is distinct from the first CCA threshold. That is, the terminal determines whether the channel is busy based on both the first CCA threshold and the second CCA threshold. According to the embodiment of the present invention, the second CCA threshold is an OBSS PD level set for determining whether a channel is busy according to a received signal strength of an inter-BSS frame. In this case, the second CCA threshold may have a value equal to or greater than the first CCA threshold.

According to another embodiment, the terminal may set or update a different network allocation vector (NAV) according to whether the received frame is an intra-BSS frame. More specifically, when the received frame is determined as an intra-BSS frame, the terminal sets or updates the first NAV (i.e., the first operation). On the other hand, if the received frame is determined as an inter-BSS frame or if it is not determined whether the received frame is an intra-BSS frame or an inter-BSS frame, the terminal sets or updates the second NAV (i.e., the second operation). According to an embodiment, the first NAV may be an intra-BSS NAV and the second NAV may be a basic NAV (or a regular NAV).

Figure 7:
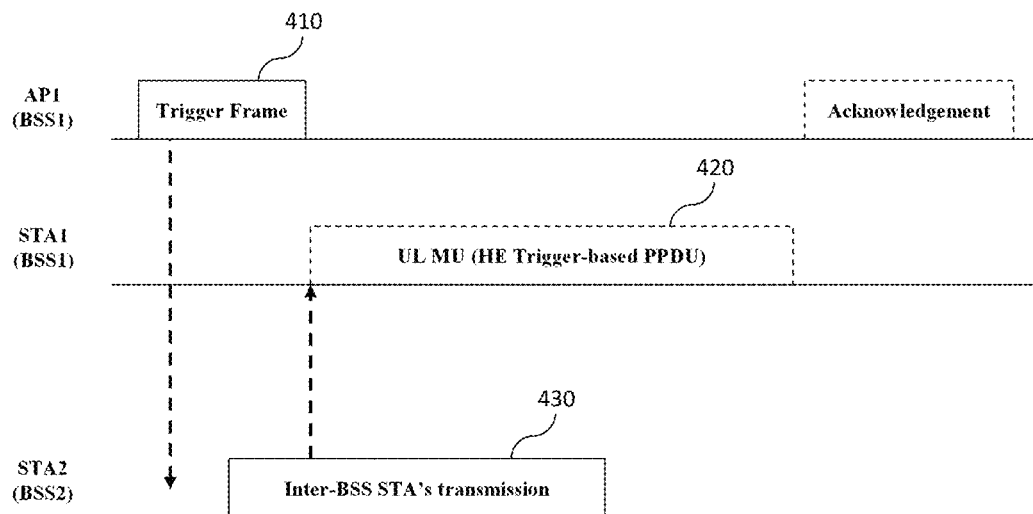
FIG. 7 illustrates a spatial reuse operation according to an embodiment of the present invention.

FIG. 7 illustrates a spatial reuse operation according to an embodiment of the present invention. In the embodiment of FIG. 7, AP1 and STA1 are terminals of the first BSS (i.e., BSS1), and STA2 is a terminal of the second BSS (i.e., BSS2). AP1 transmits a trigger frame 410 for UL-MU transmission of BSS1. In this case, it is assumed that the CS required subfield of the trigger frame 410 is set to 1. STA1 of BSS1 and STA2 of BSS2 receive the trigger frame 410. The STA2 can perform the spatial reuse operation because the received trigger frame 410 is an inter-BSS frame. However, if there is no separate constraint condition, STA2 may start transmission of a PPDU 430 before the transmission of the trigger frame 410 is completed. If the transmission of the PPDU 430 of the STA2 continues after the completion of the transmission of the trigger frame 410, it may affect the carrier sense of STA1 which intends to transmit a trigger-based PPDU 420. More specifically, when the CS required subfield of the trigger frame 410 is set to 1, STA 1 performs the CCA-ED to transmit the trigger-based PPDU 420 in response to the trigger frame 410. However, due to the interference of the PPDU 430 transmitted by STA2, STA1 may determine that the channel is busy as a result of the CCA-ED. As like above, the UL-MU transmission process of the BSS1 may be interrupted due to the spatial reuse operation of the inter-BSS terminal.

Figure 8:
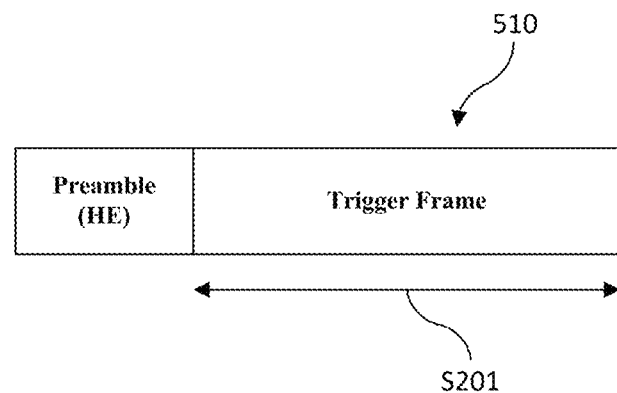
FIG. 8 illustrates an embodiment of the present invention for restricting a spatial reuse operation.

FIG. 8 illustrates an embodiment of the present invention for restricting a spatial reuse operation. According to an exemplary embodiment of the present invention, a spatial reuse operation of a terminal receiving an inter-BSS PPDU 510 containing a trigger frame may be prohibited until the end of the transmission of the PPDU 510 (S201). According to the embodiment of the present invention, if the inter-BSS PPDU 510 containing the trigger frame is in a predetermined PPDU format, the spatial reuse operation may be prohibited. More specifically, if the inter-BSS PPDU 510 containing the trigger frame is an HE single-user (SU) PPDU or an HE extended range SU PPDU, the spatial reuse operation may be prohibited. Therefore, a terminal receiving the inter-BSS PPDU 510 in the HE SU PPDU or the HE extended range SU PPDU format determines that the channel is busy and does not perform the spatial reuse operation. When the spatial reuse operation is prohibited until the end of transmission of the inter-BSS PPDU 510 containing the trigger frame, it is possible to prevent interference from occurring when STAs indicated by the trigger frame perform carrier sense. According to a further embodiment of the present invention, not only when the received inter-BSS PPDU 510 contains the trigger frame but also when it contains the predetermined frame or information, the spatial reuse operation of the terminal receiving the PPDU 510 may be prohibited until the end of the transmission of the PPDU 510 (S201).

Various signaling methods may be used to prohibit the spatial reuse operation until the end of the transmission of the PPDU 510. According to an embodiment of the present invention, the trigger frame contained in the PPDU 510 may be identified via a type field and/or a subtype field of a frame control field of the MAC header. Accordingly, when the type field and/or the subtype field of the frame control field of the MAC header of a frame contained in the inter-BSS PPDU 510 indicates a trigger frame, the terminal receiving the PPDU 510 may not perform the spatial reuse operation.

According to another embodiment of the present invention, information prohibiting the spatial reuse operation may be signaled through the preamble of the PPDU 510. For example, when a spatial reuse (SR) field of HE-SIG-A of the PPDU 510 is set to a specific value (i.e., the first value), the spatial reuse operation may be prohibited. According to the embodiment of the present invention, when the trigger frame is carried in an HE SU PPDU or an HE extended range SU PPDU, the SR field of HE-SIG-A of the corresponding PPDU may be set to the first value prohibiting the spatial reuse operation. Therefore, when the SR field of HE-SIG-A of the inter-BSS PPDU 510 is set to the first value prohibiting the spatial reuse operation, the terminal receiving the PPDU 510 may not perform the spatial reuse operation. In this case, the spatial reuse operation is prohibited until the end of the transmission of the PPDU 510 as described above. The terminal receiving the inter-BSS PPDU 510 whose SR field is set to the first value prohibiting the spatial reuse operation determines that the channel is busy and does not perform the spatial reuse operation. As described above, when the information for prohibiting the spatial reuse operation is signaled through the preamble, whether or not to perform the spatial reuse operation can be determined at an earlier point than the case where the information is signaled through the MAC header.

Figure 9:
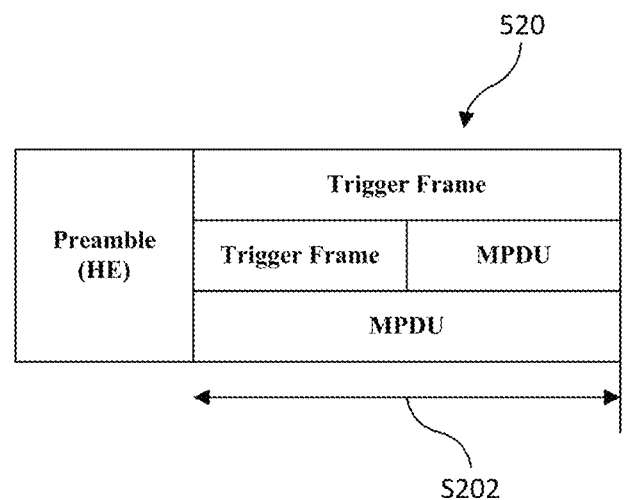
FIG. 9 illustrates another embodiment of the present invention for restricting a spatial reuse operation.

FIG. 9 illustrates another embodiment of the present invention for restricting a spatial reuse operation. According to another embodiment of the present invention, a terminal receiving an inter-BSS PPDU 520 containing a trigger frame may perform a restricted spatial reuse operation until the end of the transmission of the PPDU 520 (S202). According to an embodiment of the present invention, if the inter-BSS PPDU 520 containing the trigger frame is in a predetermined PPDU format, the spatial reuse operation may be restricted to be performed within the duration of the PPDU 520. More specifically, if the inter-BSS PPDU 520 containing the trigger frame is an HE MU PPDU, the spatial reuse operation may be restricted to be performed within the duration of the PPDU 520. Therefore, a terminal receiving the inter-BSS PPDU 520 in the HE MU PPDU format may perform the spatial reuse operation only until the end of the transmission of the PPDU 520. If the spatial reuse operation is restricted to be performed within the duration of the inter-BSS PPDU 520 containing the trigger frame, it is possible to prevent interference from occurring when STAs indicated by the trigger frame perform carrier sense. According to a further embodiment of the present invention, not only when the received inter-BSS PPDU 510 contains the trigger frame but also when it contains the predetermined frame or information, the spatial reuse operation of the terminal receiving the PPDU 520 may be restricted to be performed within the duration of the PPDU 520 (S202).

Various signaling methods may be used to restrict the spatial reuse operation to be performed within the duration of the PPDU 520. According to an embodiment of the present invention, the trigger frame contained in the PPDU 520 may be identified via the type field and/or the subtype field of the frame control field of the MAC header. Accordingly, when the type field and/or the subtype field of the frame control field of the MAC header of the frame contained in the inter-BSS PPDU 520 indicates a trigger frame, the terminal receiving the PPDU 520 may perform the spatial reuse operation only until the end of the transmission of the PPDU 520.

According to another embodiment of the present invention, information restricting the spatial reuse operations may be signaled through the preamble of the PPDU 520. For example, when an SR field of HE-SIG-A of the PPDU 520 is set to a specific value (i.e., the second value), the spatial reuse operation may be restricted. According to the embodiment of the present invention, when the trigger frame is carried in an HE MU PPDU, the SR field of HE-SIG-A of the corresponding PPDU may be set to the second value restricting the spatial reuse operation. Accordingly, when the SR field of HE-SIG-A of the inter-BSS PPDU 520 is set to the second value restricting the spatial reuse operation, the terminal receiving the PPDU 520 may perform the spatial reuse operation only until the end of the transmission of the PPDU 520. As described above, when the information for restricting the spatial reuse operation is signaled through the preamble, whether or not to perform the spatial reuse operation can be determined at an earlier point than the case where the information is signaled through the MAC header.

Figure 10:
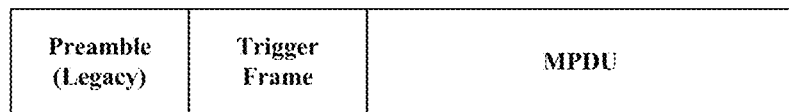
FIG. 10 illustrates a legacy PPDU containing a trigger frame.

FIG. 10 illustrates a legacy PPDU containing a trigger frame. The legacy PPDU includes a very high throughput (VHT) PPDU, a high throughput (HT) PPDU, a non-HT PPDU, and a non-HT duplicate PPDU, but the present invention is not limited thereto.

The trigger frame may be carried in a legacy PPDU. According to the embodiment of the present invention, in the legacy PPDU, the trigger frame may be transmitted in the form of A-MPDU with which any other frame is aggregated. However, the trigger frame may be transmitted in the form of A-MPDU when it is carried in an HT PPDU or a VHT PPDU among legacy PPDUs. According to an embodiment, the trigger frame may be aggregated with a multicast data frame to form an A-MPDU and be transmitted through a legacy PPDU. When the trigger frame is transmitted through the legacy PPDU, legacy STAs can perform an appropriate defer operation. In addition, the trigger frame may be aggregated with other types of trigger frame, such as an MU-block ACK request (BAR) frame, to form an A-MPDU and be transmitted through the legacy PPDU. When the trigger frame and any other frame are aggregated to form an A-MPDU, the trigger frame may be located at the start of the corresponding A-MPDU. Thus, even after the trigger frame is decoded, the duration of the PPDU may remain by another aggregated frame.

The non-legacy terminal may identify the trigger frame in the legacy PPDU and determine whether the frame is an intra-BSS frame or an inter-BSS frame. More specifically, the non-legacy terminal may identify the trigger frame based on information of the MAC header of the trigger frame contained in the legacy PPDU. The trigger frame may be identified via a type field and/or a subtype field of the MAC header. Also, the non-legacy terminal may determine whether the corresponding frame is an intra-BSS frame or an inter-BSS frame based on the information of the MAC header. Whether the frame is an intra-BSS frame or an inter-BSS frame can be determined based on MAC address information of the MAC header. Therefore, the non-legacy terminal that has decoded the trigger frame of the legacy PPDU may identify the corresponding trigger frame based on the information of the MAC header, and determine whether the corresponding frame is an intra-BSS frame or an inter-BSS frame based on the information of the MAC header.

According to a further embodiment of the invention, whether the legacy PPDU carries a trigger frame can be identified via a legacy preamble. In this case, the legacy preamble may be HT SIG or VHT SIG, but the present invention is not limited thereto. For example, whether a trigger frame is carried in the PPDU may be signaled via a particular field of the legacy preamble. The particular field may be a reserved field of a service field. According to another embodiment, whether a trigger frame is carried in the PPDU may be signaled via at least one guard subcarrier of the preamble. The non-legacy terminal can identify the trigger frame in the legacy PPDU through the signaling information.

Figure 11:
FIG. 11 illustrates a non-legacy PPDU containing a trigger frame.

FIG. 11 illustrates a non-legacy PPDU containing a trigger frame. The non-legacy PPDU include a high efficiency (HE) PPDU, but the invention is not limited thereto.

The trigger frame may be carried in a non-legacy PPDU. According to the embodiment of the present invention, in the non-legacy PPDU, the trigger frame may be transmitted in the form of A-MPDU with which any other frame is aggregated. According to an embodiment, the trigger frame may be aggregated with a multicast data frame to form an A-MPDU and be transmitted through a non-legacy PPDU. When the trigger frame is transmitted through the non-legacy PPDU, new functions of the non-legacy wireless LAN system may be additionally used. In addition, the trigger frame may be aggregated with other types of trigger frames, such as an MU-BAR frame, to form an A-MPDU and be transmitted through the non-legacy PPDU. When the trigger frame and any other frame are aggregated to form an A-MPDU, the trigger frame may be located at the start of the corresponding A-MPDU. Thus, even after the trigger frame is decoded, the duration of the PPDU may remain by another aggregated frame.

The non-legacy terminal may determine whether the non-legacy PPDU contains an intra-BSS PPDU (i.e., the PPDU is an intra-BSS PPDU) or an inter-BSS frame (i.e., the PPDU is an inter-BSS PPDU) based on one or more determination conditions. First, the non-legacy terminal may determine whether the PPDU contains an intra-BSS frame or an inter-BSS frame based on the BSS color value of HE-SIG-A of the non-legacy PPDU. However, in a BSS color collision situation where different BSSs use the same BSS color, the non-legacy terminal may perform decoding by misinterpreting an inter-BSS frame as an intra-BSS frame. In this case, the non-legacy terminal may additionally determine whether the frame is an intra-BSS frame or an inter-BSS frame based on information (e.g., MAC address) of the MAC header of the MAC frame contained in the PPDU. If the determination based on the BSS color is different from the determination based on the MAC address, the non-legacy terminal may finally determine whether the PPDU contains an intra-BSS frame or an inter-BSS frame according to the determination based on the MAC address. Also, the non-legacy terminal may identify a trigger frame based on information of the MAC header of the trigger frame contained in the non-legacy PPDU. The trigger frame may be identified via a type field and/or a subtype field of the MAC header. Accordingly, the non-legacy terminal that has decoded the trigger frame of the non-legacy PPDU may identify the corresponding trigger frame based on the information of the MAC header, and determine whether the corresponding frame is an intra-BSS frame or an inter-BSS frame based on the information of the MAC header.

According to a further embodiment of the present invention, the non-legacy terminal may determine whether to continue decoding the PPDU based on a UL/DL field value of HE-SIG-A of the non-legacy PPDU. For example, the AP may continue decoding the corresponding PPDU when the UL/DL field of HE-SIG-A of the received PPDU is set to UL. In addition, the non-AP STA may continue decoding the corresponding PPDU when the UL/DL field of HE-SIG-A of the received PPDU is set to DL.

Figure 12:
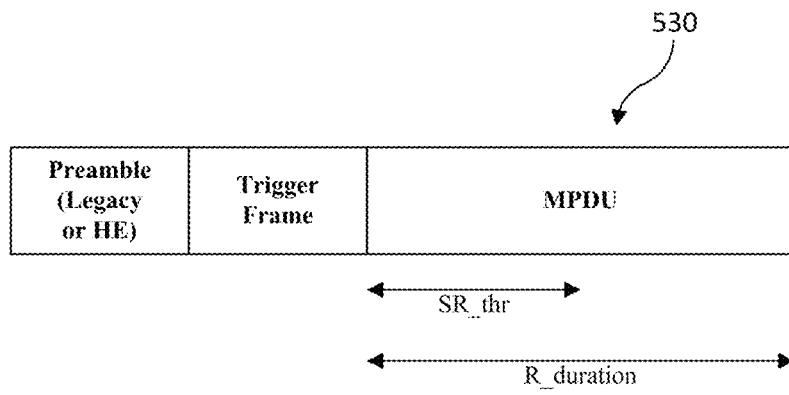
FIG. 12 illustrates a further embodiment of the invention for restricting a spatial reuse operation.

FIG. 12 illustrates a further embodiment of the invention for restricting a spatial reuse operation. As described above in the embodiments of FIGS. 10 and 11, the non-legacy terminal can identify the trigger frame in a received PPDU 530 and determine whether the frame is an intra-BSS frame or an inter-BSS frame. In this case, the PPDU 530 that the non-legacy terminal can identify and determine includes both the legacy PPDU and the non-legacy PPDU. If the trigger frame contained in the received PPDU 530 is aggregated with another frame to form an A-MPDU, the duration of the PPDU 530 may remain even after the trigger frame is decoded.

According to the embodiment of the present invention, a terminal receiving an inter-BSS PPDU 530 containing a trigger frame may be restricted in the spatial reuse operation during the remaining duration R_duration of the PPDU 530. According to an embodiment, if the received PPDU 530 is an inter-BSS PPDU and contains a trigger frame, the spatial reuse of the terminal may be prohibited for the remaining duration R_duration of the PPDU 530. In this case, the terminal determines that the channel is busy and does not perform the spatial reuse. According to another embodiment, if the received PPDU 530 is an inter-BSS PPDU and contains a trigger frame, the terminal may perform a restricted spatial reuse operation for the remaining duration R_duration of the PPDU 530. That is, the spatial reuse operation of the terminal is restricted to be performed within the remaining duration R_duration of the PPDU 530. By restricting the spatial reuse operation as described above, it is possible to prevent interference from occurring when STAs indicated by the trigger frame perform carrier sense.

According to a further embodiment of the present invention, the restriction of the spatial reuse operation described above can be performed conditionally. More specifically, the terminal receiving the inter-BSS PPDU 530 containing the trigger frame may adjust the spatial reuse operation depending on whether the remaining duration R_duration of the PPDU 530 is greater than a predetermined threshold SR_thr. If the remaining duration R_duration of the PPDU 530 is greater than the predetermined threshold SR_thr, the terminal may perform the restricted spatial reuse operation for the remaining duration R_duration of the PPDU 530. However, if the remaining duration R_duration of the PPDU 530 is less than the predetermined threshold SR_thr, the spatial reuse of the terminal may be prohibited for the remaining duration R_duration of the PPDU 530.

Figure 13:
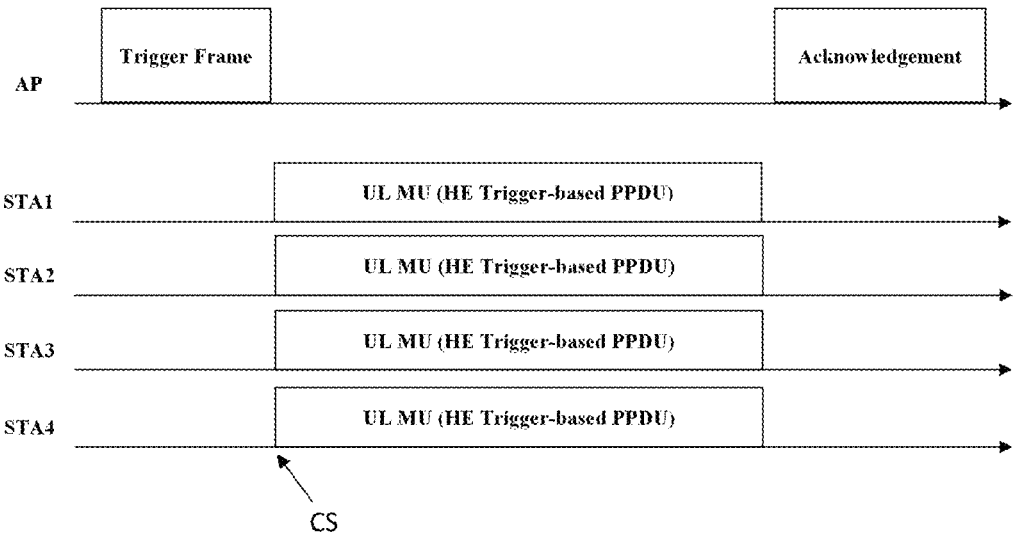
FIG. 13 illustrates a spatial reuse operation according to an embodiment of the present invention.

FIG. 13 illustrates a spatial reuse operation according to an embodiment of the present invention. As described above in the embodiments of FIGS. 10 and 11, the non-legacy terminal can identify the trigger frame in a received PPDU and determine whether the frame is an intra-BSS frame or an inter-BSS frame. When the spatial reuse operation for the inter-BSS PPDU containing the trigger frame is restricted in accordance with the embodiment of the present invention, it is possible to prevent interference from occurring when STAs that intend to transmit a trigger-based PPDU perform carrier sense. According to the embodiment of the present invention, such a frame protection can be performed not only for the trigger frame but also for an ACK corresponding to the UL-MU transmission. More specifically, in a manner as described in the embodiment of FIG. 8, the SR field of HE-SIG-A of the PPDU containing the ACK may be set to the first value prohibiting the spatial reuse operation. Further, in a manner similar to that described in the embodiments of FIGS. 10 and 11, an ACK frame contained in the PPDU can be identified. In this case, the spatial reuse operation of a terminal receiving the inter-BSS PPDU containing the ACK may be prohibited until the transmission of the corresponding PPDU is completed. Alternatively, in a manner as described in the embodiment of FIG. 9, the SR field of HE-SIG-A of the PPDU containing the ACK may be set to the second value restricting the spatial reuse operation. Further, in a manner similar to that described in the embodiments of FIGS. 10 and 11, an ACK frame contained in the PPDU can be identified. In this case, the spatial reuse operation of a terminal receiving the inter-BSS PPDU containing the ACK may be restricted to be performed within the duration of the corresponding PPDU.

HE MU PPDU of Inter-BSS

Figure 14:
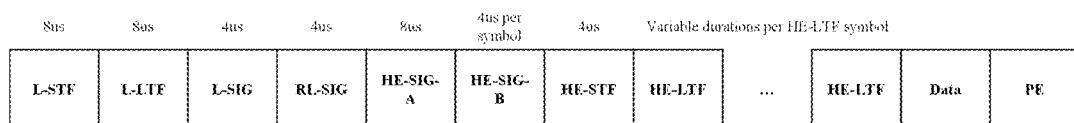
FIG. 14 illustrates an HE MU PPDU format according to an embodiment of the present invention.

FIG. 14 illustrates an HE MU PPDU format according to an embodiment of the present invention. Referring to FIG. 14, the HE MU PPDU may contain a legacy preamble and a non-legacy preamble. The legacy preamble includes L-STF, L-LTF and L-SIG. The non-legacy preamble of the HE MU PPDU includes RL-SIG, HE-SIG-A, HE-SIG-B, HE-STF and HE-LTF.

The HE-SIG-A of the HE MU PPDU contains a UL/DL field. The UL/DL field indicates the transmission direction of the corresponding PPDU. That is, the field indicates whether the corresponding PPDU is transmitted via an uplink or transmitted via a downlink. The HE-SIG-B field is present in the HE MU PPDU and is transmitted in units of 20 MHz. In addition, the HE-SIG-B field indicates information necessary for receiving the HE MU PPDU. As will be described later in the embodiment of FIG. 15, the HE-SIG-B consists of a common block field and a user specific field.

Figure 15:
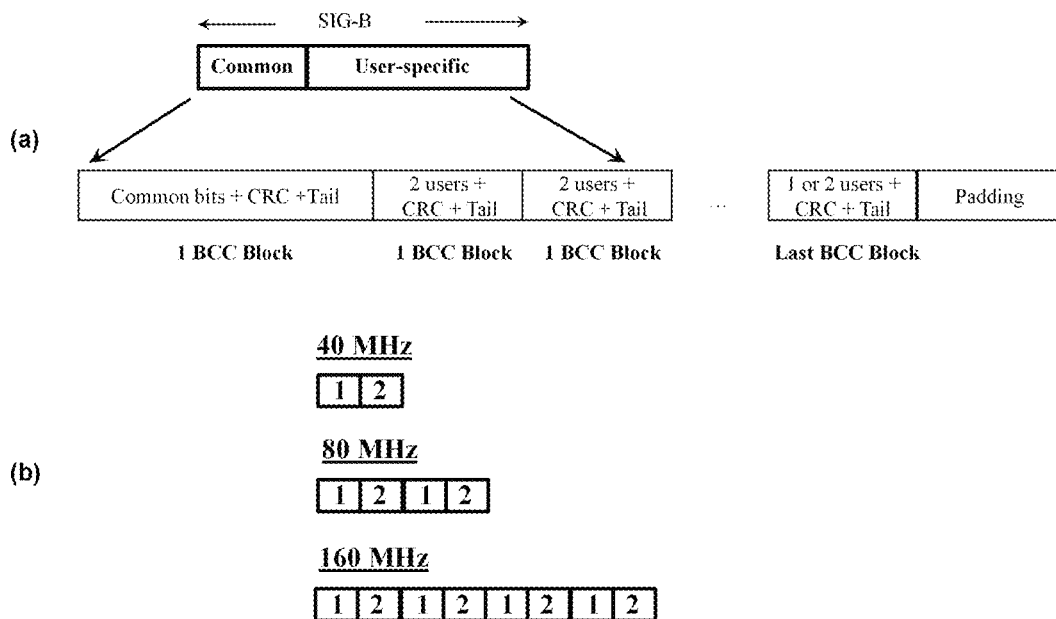
FIG. 15 illustrates an encoding structure and transmission method of an HE-SIG-B according to an embodiment of the present invention.

FIG. 15 illustrates an encoding structure and transmission method of an HE-SIG-B according to an embodiment of the present invention. FIG. 15(*a*) illustrates the encoding structure of HE-SIG-B, and FIG. 15(*b*) illustrates the transmission method of HE-SIG-B in a bandwidth of 40 MHz or more.

Referring to FIG. 15(*a*), the HE-SIG-B consists of a common block field and a user specific field. First, the common block field contains a resource unit (RU) allocation field. The RU allocation field contains information on resource unit allocation of a specific bandwidth (e.g., 20 MHz) in the frequency domain. More specifically, the RU allocation field is configured in units of 8 bits and indexes the size of the resource units constituting the specific bandwidth and their placement in the frequency domain. In addition, the RU allocation field may indicate the number of users in each resource unit. When the total bandwidth through which the PPDU is transmitted is greater than a predetermined bandwidth (e.g., 40 MHz), the RU allocation field may be set to a multiple of 8 bits to carry information in units of the specific bandwidth.

On the other hand, the user specific field consists of a plurality of user fields, and carries information for a STA designated to each allocated resource unit. Each user field of the user specific field is arranged in order of allocated users in the resource unit arrangement indicated by the RU allocation field of the common block field. A plurality of user fields are transmitted in units of a user block field. The user block field is made up of an aggregation of two user fields, a CRC field and a tail field. Depending on the total number of user fields, the last user block field may contain information for one or two STAs. For example, if a total of three users (i.e., STA1, STA, and STA3) are designated, information for STA1 and STA2 is coded and transmitted along with the CRC/tail field in the first user block field, and information for STA3 may be coded and transmitted along with the CRC/tail field in the last user block field. That is, if the total number of user fields is odd, the last user block field may contain one user field. At the end of the HE-SIG-B, padding may be added along the OFDM symbol boundary.

Each user field contains an STA-ID field, and the STA-ID field indicates an AID of the receiver of the corresponding resource unit. Exceptionally, when the HE MU PPDU is used for an uplink transmission, the STA-ID field may indicate an AID of the transmitter. When one user is allocated to one resource unit (i.e., non-MU-MIMO allocation), the user field may contain a number of spatial streams (NSTS) field, a transmit beamforming (TxBF) field, a modulation and coding scheme (MCS) field, a dual sub-carrier modulation (DCM) field and a coding field. On the other hand, when a plurality of users are allocated to one resource unit (i.e., MU-MIMO allocation), the user field contains a space configuration field (SCF), an MCS field, a DCM field and a coding field.

Referring to FIG. 15(*b*), HE-SIG-B is separately encoded on each 20 MHz band. In this case, the HE-SIG-B may consist of a maximum of two contents in units of 20 MHz, that is, an HE-SIG-B content channel 1 and an HE-SIG-B content channel 2. In the embodiment of FIG. 15(*b*), each box represents a 20 MHz band, and "1" and "2" in the boxes represent the HE-SIG-B content channel 1 and the HE-SIG-B content channel 2, respectively. Each HE-SIG-B content channel in the total band is arranged in order of the physical frequency band. That is, the HE-SIG-B content channel 1 is transmitted in the lowest frequency band, and the HE-SIG-B content channel 2 is transmitted in the next higher frequency band. Such a content channel configuration is then duplicated through content duplication in the next higher frequency bands. For example, for the first to fourth channels with an increasing order of the frequency constituting the entire 80 MHz band, the HE-SIG-B content channel 1 is transmitted on the first channel and the third channel, and the HE-SIG-B content channel 2 is transmitted on the second channel and the fourth channel. Likewise, for the first to eighth channels with an increasing order of the frequency constituting the entire 160 MHz band, the HE-SIG-B content channel 1 is transmitted on the first channel, the third channel, the fifth channel and the seventh channel, and the HE-SIG-B content channel 2 is transmitted on the second channel, the fourth channel, the sixth channel and the eighth channel. When the terminal can decode the HE-SIG-B content channel 1 through at least one channel and decode the HE-SIG-B content channel 2 through the other at least one channel, information on the MU PPDU configuration of the total bandwidth can be obtained. On the other hand, when the total bandwidth is 20 MHz, only one SIG-B content channel is transmitted.

According to the embodiment of the present invention, when the HE MU PPDU is transmitted via an uplink, the STA-ID field of each user field of the HE-SIG-B of the corresponding PPDU may indicate an AID of the transmitter. That is, when the UL/DL field in the HE-SIG-A of the HE MU PPDU is set to UL, the STA-ID field of each user field in the HE-SIG-B of the corresponding PPDU indicates the AID of the transmitter. Since the recipient of the HE MU PPDU transmitted via an uplink is an AP, it is possible to support the spatial reuse operation by allowing the STA-ID field of the user field of the corresponding PPDU to indicate the AID of the transmitter.

According to a further embodiment of the present invention, the configuration of the HE-SIG-B may be adjusted to reduce the overhead of the HE-SIG-B when the HE MU PPDU is transmitted via an uplink. For example, the resource unit allocation field of HE-SIG-B may be expressed in the form of the resource unit allocation field of the trigger frame. In addition, the user specific field of HE-SIG-B may contain a user field only for one user. In addition, the HE-SIG-B contents in each 20 MHz band may be set equal to each other.

Figure 16:
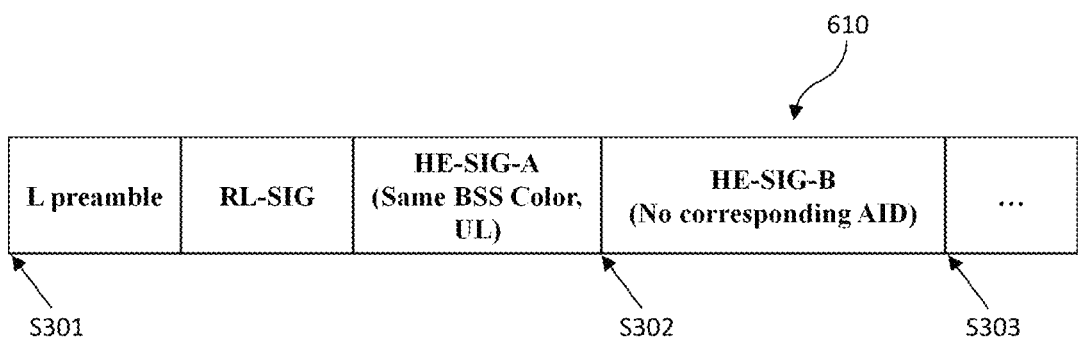
FIG. 16 illustrates a method for determining an intra-BSS frame and an inter-BSS frame according to a further embodiment of the present invention.

FIG. 16 illustrates a method for determining an intra-BSS frame and an inter-BSS frame according to a further embodiment of the present invention. As described above, the terminal may determine whether a PPDU 610 contains an intra-BSS frames (i.e., the PPDU is an intra-BSS PPDU) or an inter-BSS frame (i.e., the PPDU is an inter-BSS PPDU) based on one or more determination conditions. However, in a BSS color collision situation where different BSSs use the same BSS color, the terminal may perform decoding by misinterpreting an inter-BSS frame as an intra-BSS frame. In this case, the terminal may determine whether the PPDU 610 contains an intra-BSS frame or an inter-BSS frame by considering other conditions for intra/inter-BSS determination.

FIG. 16 illustrates an intra/inter-BSS determination procedure when an AP receives an HE MU PPDU 610 transmitted via an uplink. In the embodiment of FIG. 16, it is assumed that the PPDU 610 received by the AP is a PPDU transmitted from other BSS using the same BSS color as the BSS of the AP. First, the AP receives the PPDU 610 (S301). The AP may determine whether the PPDU 610 contains an intra-BSS frame or an inter-BSS frame based on preamble information of the PPDU 610. If the PPDU 610 is an HE MU PPDU, the preamble of the PPDU 610 contains HE-SIG-A and HE-SIG-B.

First, the AP decodes the HE-SIG-A of the PPDU 610 and performs intra/inter-BSS determination based on information of the decoded HE-SIG-A (S302). More specifically, the AP determines whether the PPDU 610 contains an intra-BSS frame or an inter-BSS frame based on the information of the BSS color field in the HE-SIG-A of the PPDU 610. As described above, if the BSS color of the PPDU 610 is equal to the BSS color of the BSS of the AP, the AP determines that the PPDU 610 contains an intra-BSS frame. However, if the BSS color of the PPDU 610 is not equal to the BSS color of the BSS of the AP, the AP determines that the PPDU 610 contains an inter-BSS frame. Since the BSS color collision occurs in the embodiment of FIG. 16, the AP may determine that the PPDU 610 contains an intra-BSS frame in step S302. Thus, the AP continues decoding the PPDU 610. Meanwhile, the AP may identify that the UL/DL field is set to UL in the decoding process of the HE-SIG-A of the PPDU 610.

Next, the AP decodes the HE-SIG-B of the PPDU 610 and performs intra/inter-BSS determination based on information of the decoded HE-SIG-B (S303). More specifically, the AP determines whether the PPDU 610 contains an intra-BSS frame or an inter-BSS frame based on the information of the user specific field of the HE-SIG-B of the PPDU 610. As described above, if the PPDU 610 is an HE MU PPDU transmitted via an uplink, the STA-ID field of the user field in the HE-SIG-B of the PPDU 610 indicates an AID of the transmitter. Accordingly, if the AID indicated by the user field of the HE-SIG-B in the PPDU 610 contains a value that is not assigned in the BSS of the AP, the AP determines that the PPDU 610 contains an inter-BSS frame.

As described above, according to the embodiment of the present invention, one or more conditions can be used for intra/inter-BSS determination of the PPDU 610. For example, the AP may determine whether the PPDU 610 contains an intra-BSS frame or an inter-BSS frame based on at least one of the information of the BSS color field in the HE-SIG-A of the PPDU 610 and the information of the user specific field in the HE-SIG-B of the PPDU 610. Moreover, the AP may determine whether the PPDU 610 contains an intra-BSS frame or an inter-BSS frame based on at least one of the information of the user specific field in the HE-SIG-B of the PPDU 610 and the information of the MAC address field of the MAC frame contained in the PPDU 610. However, determination results may be different in two or more intra/inter-BSS determination conditions among the above listed conditions. That is, the received PPDU 610 may satisfy both the intra-BSS determination condition and the inter-BSS determination condition. According to the embodiment of the present invention, when the PPDU 610 satisfies both the intra-BSS condition and the inter-BSS condition, the determination based on the user field of the HE-SIG-B may take precedence over the determination based on the BSS color field of the HE-SIG-A. Further, the determination based on the MAC address field may take precedence over the determination based on the user specific field of HE-SIG-B.

The AP may perform either the first operation or the second operation distinct from each other according to the final result of the intra/inter-BSS determination. That is, when it is determined that the PPDU 610 contains an intra-BSS frame, the AP may perform the first operation. Specific embodiments of the first operation are as described above. Meanwhile, when it is determined that the PPDU 620 contains an inter-BSS frame, the AP may perform the second operation. According to the embodiment of the present invention, the second operation may be a spatial reuse operation, and specific embodiments thereof are as described above.

Figure 17:
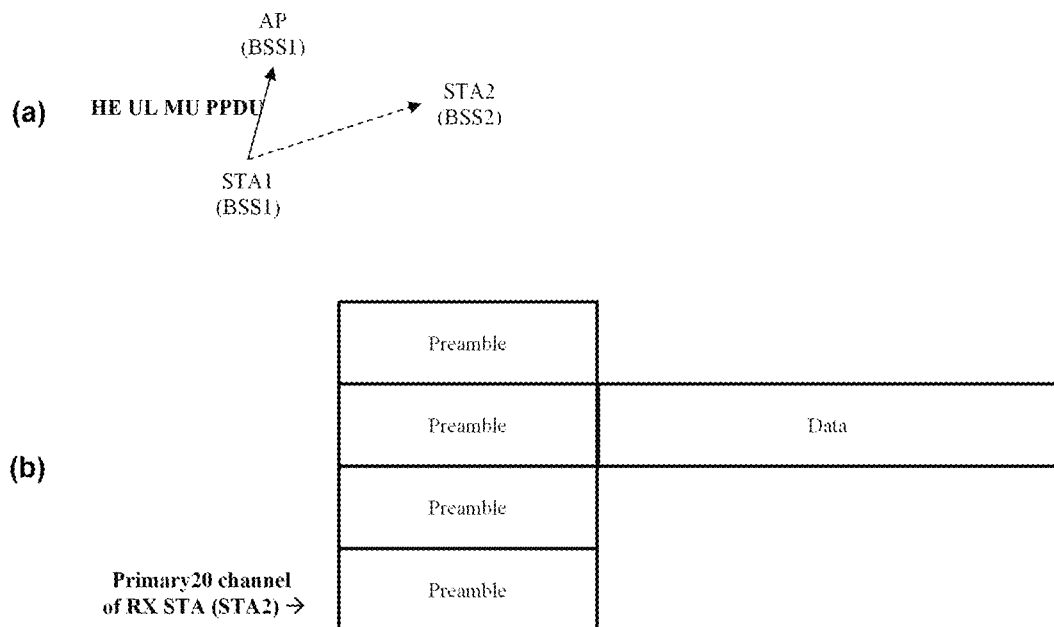
FIG. 17 illustrates an embodiment for transmitting an HE MU PPDU via an uplink and setting a NAV accordingly.

FIG. 17 illustrates an embodiment for transmitting an HE MU PPDU via an uplink and setting a NAV accordingly. In the embodiment of FIG. 17, AP and STA1 are terminals of the first BSS (e.g., BSS1), and STA2 is a terminal of the second BSS (e.g., BSS2). As shown in FIG. 17(*a*), STA1 transmits an uplink HE MU PPDU to the AP.

Referring to FIG. 17(*b*), the STA may transmit data using some of the resource units among all available resource units when transmitting the HE MU PPDU. For example, the STA may perform uplink data transmission on a specific resource unit using the HE MU PPDU in order to transmit data through a resource unit with better channel conditions. Alternatively, the STA may perform uplink data transmission on a specific resource unit using the HE MU PPDU in order to transmit data with avoiding the resource units already occupied. According to an embodiment of the present invention, the STA may transmit the HE MU PPDU using a resource unit that does not include the primary 20 MHz channel of the BSS with which the STA is associated.

According to the embodiment of the present invention, even if data of the HE MU PPDU is transmitted via the uplink using only some resource units, the STA may transmit the preamble of the PPDU on a 20 MHz, 40 MHz, 80 MHz or 160 MHz (80+80 MHz) channel including the corresponding resource unit according to the conventional channel bonding rules. In this manner, the probability that the AP succeeds in receiving the HE MU PPDU may increase, and the intra-BSS STAs may perform the correct defer operation.

Referring to FIG. 17(a), the HE MU PPDU transmitted by STA1 of BSS1 may be received by STA2 of BSS2 which is another BSS. STA2 may decode the HE-SIG-A of the PPDU transmitted by the STA1 and identify that the PPDU contains an inter-BSS frame, is an HE MU PPDU, and is transmitted via the uplink. Also, STA2 may decode the HE-SIG-B of the PPDU and identify the location of the resource unit on which data of the PPDU is to be transmitted. According to the embodiment of the present invention, when it is determined, as a result of decoding the HE-SIG-B of the inter-BSS PPDU, that the resource unit on which the data of the PPDU is to be transmitted is not included in the primary 20 MHz channel of the BSS with which STA2 is associated, STA2 may not set and update a NAV. Accordingly, STA2 can use the unoccupied channel, and the spatial reuse performance can be improved. According to another embodiment of the present invention, when it is determined, as a result of decoding the HE-SIG-B of the inter-BSS PPDU, that the resource unit on which the data of the PPDU is to be transmitted is not included in the primary 20 MHz channel of the BSS with which STA2 is associated, STA2 may set or update a NAV only until the preamble portion of the corresponding PPDU (alternatively, may determine as a CCA busy state).

Figure 18:
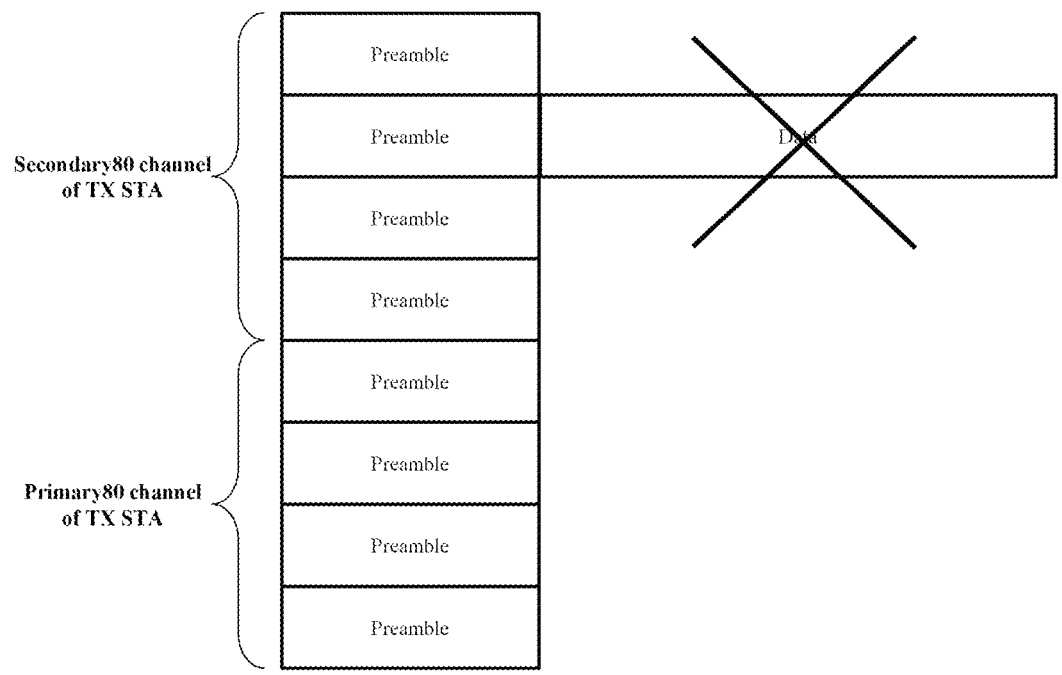
FIG. 18 illustrates another embodiment of transmitting an HE MU PPDU via an uplink.

FIG. 18 illustrates another embodiment of transmitting an HE MU PPDU via an uplink. In the embodiment of FIG. 18, duplicative description of parts which are the same or corresponding to the aforementioned embodiment of FIG. 17 will be omitted.

As shown in FIG. 18, when an uplink transmission using the HE MU PPDU is performed through an 160 MHz channel or an 80+80 MHz channel, terminals of the inter-BSS receiving the PPDU cannot identify which 80 MHz channel the location of the resource unit indicated by the resource unit allocation field of the HE-SIG-B of the PPDU corresponds to. Accordingly, the STAs of the inter-BSS receiving the PPDU cannot identify whether the resource unit included in the primary 20 MHz channel of the BSS with which the STA is associated is to be used for data transmission. Therefore, according to the embodiment of the present invention, when the HE MU PPDU is transmitted via an uplink, only the resource units included in the primary 80 MHz channel may be used.

Transmission Opportunity (TXOP) Duration

Figure 19:
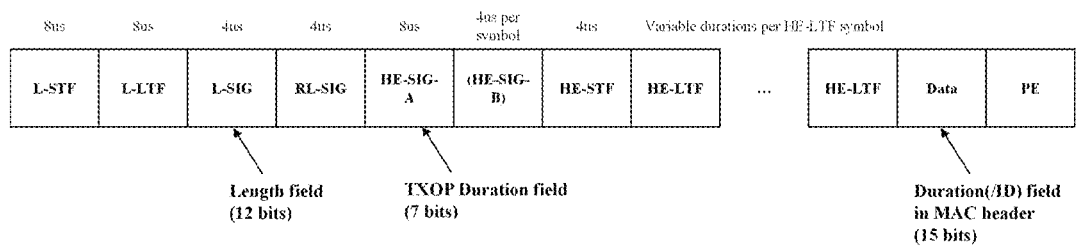
FIG. 19 illustrates an HE PPDU format according to an embodiment of the present invention.

FIG. 19 illustrates an HE PPDU format according to an embodiment of the present invention. Referring to FIG. 19, the HE PPDU may contain a legacy preamble, a non-legacy preamble, data and a packet extension (PE) field. The legacy preamble includes L-STF, L-LTF and L-SIG. The non-legacy preamble includes RL-SIG, HE-SIG-A, HE-SIG-B, HE-STF and HE-LTF. In this case, the HE-SIG-B may be contained only in a specific PPDU format, for example, an HE MU PPDU.

The L-SIG field contains a length field indicating the length of the corresponding PPDU. The length field of the L-SIG consists of 12 bits, and may be referred to as an L_Length field in the embodiment of the present invention. The HE-SIG-A field contains a TXOP duration field indicating the length of the TXOP. According to an embodiment, the TXOP duration field may consist of 7 bits. Also, the data field may contain a MAC frame, and the MAC header of the MAC frame contains a duration (or duration/ID) field. The duration field of the MAC header indicates the length of the TXOP and may consist of 15 bits. According to the embodiment of the present invention, the HE PPDU may have two or more fields, each consisting of a different number of bits, indicating a length. That is, the HE PPDU may contain a duration field of the MAC header and a TXOP duration field which consist of a different number of bits with each other.

Hereinafter, various embodiments of the method of setting and interpreting the TXOP duration field will be described with reference to the respective drawings. The STA sets or updates a NAV based on the TXOP duration value of the TXOP duration field in the HE-SIG-A of the HE PPDU. According to an embodiment of the present invention, a TXOP duration value is obtained from the TXOP duration field, and the obtained value may indicate a duration after the HE-SIG-A field in which the TXOP duration field is present. In this case, a STA receiving the HE PPDU may set or update a NAV without further calculation on the obtained TXOP duration value even when it suspends decoding after the HE-SIG-A of the corresponding PPDU. According to another embodiment of the present invention, the TXOP duration value obtained from the TXOP duration field may indicate a duration after the end of the corresponding PPDU. In this case, the TXOP duration field may not incorporate the value corresponding to the length of the corresponding PPDU in the TXOP duration value. Thus, a wider range of TXOP duration values can be represented by the limited number of bits of the TXOP duration field. In this case, a STA receiving the HE PPDU may set or update a NAV based on the sum of the the TXOP duration value obtained from the TXOP duration field and the length of the corresponding PPDU.

According to an embodiment of the present invention, the TXOP duration field may represent the TXOP duration value in units of OFDM symbol duration. Therefore, the TXOP duration value TXOP_V may be determined based on Equation 1 below.

$$TXOP\_V = TXOP\_D * symbol\_D \qquad \text{[Equation 1]}$$

In Equation 1, TXOP_D denotes the value of the TXOP duration field, and symbol_D denotes the symbol duration. That is, the TXOP duration value may be determined based on the value obtained by multiplying the value of the TXOP duration field and the symbol duration. According to an embodiment, the symbol duration may be set to a symbol length 13.6 us to which the basic cyclic prefix (CP) 0.8 us is added. According to another embodiment, the symbol duration may be set to 16 us to represent a wider range of TXOP. A STA receiving the HE PPDU sets or updates a NAV based on the thus obtained TXOP duration value.

Figure 20:
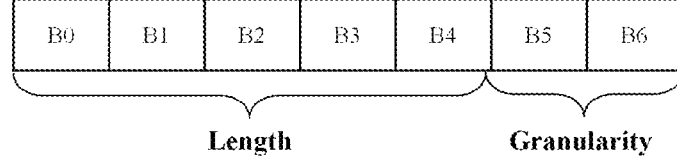
FIGS. 20 to 22 illustrate embodiments of a method of setting and interpreting a TXOP duration field.

FIG. 20 illustrates another embodiment of a method of setting and interpreting a TXOP duration field. According to another embodiment of the present invention, the TXOP duration field may contain a first bit field indicating the length of the TXOP and a second bit field indicating the granularity of the TXOP length.

FIG. 20(a) illustrates an embodiment in which the TXOP duration field consisting of 7 bits contains a first bit field consisting of 5 bits and a second bit field consisting of 2 bits. Referring to FIG. 20(b), the second bit field of the TXOP duration field may index predetermined granularity information. For example, in the second bit field, the field value '00' may indicate 4 us, the field value '01' may indicate 8 us, the field value '10' may indicate 16 us, and the field value '11' may indicate 32 us. In this case, the TXOP duration value TXOP_V may be determined based on Equation 2 below.

$$TXOP\_V = TXOP\_L * TXOP\_G \qquad \text{[Equation 2]}$$

In Equation 2, TXOP_L denotes the value (i.e., the length of the TXOP) of the first bit field of the TXOP duration field, and TXOP_G denotes the value (i.e., the granularity of the TXOP length) of the second bit field of the TXOP duration field. That is, the TXOP duration value is determined based on the value obtained by multiplying the length of the TXOP obtained from the first bit field of the TXOP duration field and the granularity of the TXOP length obtained from the second bit field of the TXOP duration field. In the embodiment of FIG. 20, the first bit field and the second bit field of the TXOP duration field consist of 5 bits and 2 bits, respectively, but the present invention is not limited thereto. According to another embodiment of the present invention, the first bit field and the second bit field of the TXOP duration field may consist of 6 bits and 1 bit, respectively, and the size of each bit field may be modified according to the embodiment. A STA receiving the HE PPDU sets or updates a NAV based on the thus obtained TXOP duration value.

Figures 21, 22:
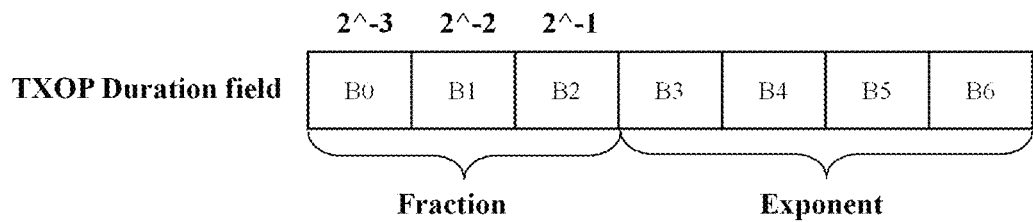

FIG. 21 illustrates yet another embodiment of a method of setting and interpreting the TXOP duration field. According to yet another embodiment of the present invention, the TXOP duration value may be obtained using both the value obtained from the TXOP duration field and the value of the L_Length field of L-SIG. For example, the TXOP duration value TXOP_V may be calculated based on Equation 3 below.

$$TXOP\_V = L\_Length\_V * TXOP\_FV \qquad \text{[Equation 3]}$$

In Equation 3, L_Length_V denotes the value of the L_Length field of L-SIG, and TXOP_FV denotes the value obtained from the TXOP duration field. That is, the TXOP duration value is determined based on the value obtained by multiplying the value obtained from the TXOP duration field and the value of the L_Length field. In this case, the value L_Length_V of the L_Length field may be a value converted in units of time.

According to the embodiment of the present invention, the TXOP duration field may represent various values using the floating-point representation method. Referring to FIG. 21, the TXOP duration field may contain a third bit field indicating a fractional value and a fourth bit field indicating an exponent value. In this case, the value TXOP_FV obtained from the TXOP duration field may be expressed by Equation 4 below.

$$TXOP\_FV = (1 + TXOP\_Frac) * 2^{\wedge}(TXOP\_Exp - bias) \qquad \text{[Equation 4]}$$

In Equation 4, TXOP_Frac denotes the value (i.e., fractional value) of the third bit field of the TXOP duration field, and TXOP_Exp denotes the value (i.e., exponent value) of the fourth bit field of the TXOP duration field. If the TXOP duration field consists of n bits and the third bit field thereof consists of n_f bits, the fourth bit may consist of n−n_f bits. In this case, TXOP_Frac may be calculated by Equation 5 below.

$$TXOP\_Frac = \sum_{k=0}^{n\_f-1} B(k) * 2^{\wedge}(k - n\_f) \qquad \text{[Equation 5]}$$

In Equation 5, B(k) denotes the value of the bit k of the TXOP duration field. That is, TXOP_Frac is determined by adding the value of $B(k)*2^{\wedge}(k-n\_f)$ until k becomes from 0 to n_f−1. In Equation 4, TXOP_Exp may be any value from 0 to $2^{\wedge}(n-n\_f)-1$, which indicates the value of the fourth bit field of the TXOP duration field in decimal. Further, in Equation 4, the bias may be $2^{\wedge}(n-n\_f-1)-1$. That is, when n is 7 and n_f is 3 as in the embodiment shown in FIG. 21, the bias may be 7. On the other hand, when the TXOP_V obtained according to the embodiment of FIG. 21 is not an integer, the TXOP duration value may be determined by rounding up, rounding down, or rounding off TXOP_V in units of us.

FIG. 22 illustrates still another embodiment of a method of setting and interpreting a TXOP duration field. According to still another embodiment of the present invention, the granularity of the value indicated by the TXOP duration field may be different depending on the type of the PPDU. Therefore, the TXOP duration value TXOP_V may be determined based on Equation 6 below.

$$TXOP\_V = TXOP\_D * G\_PPDU \qquad \text{[Equation 6]}$$

In Equation 6, TXOP_D denotes the value of the TXOP duration field, and G_PPDU denotes the predetermined granularity of the TXOP duration according to the type of the PPDU. That is, the TXOP duration value may be determined based on the value obtained by multiplying the value of the TXOP duration field and the granularity according to the type of the PPDU.

FIG. 22 illustrates an example of the predetermined granularity according to the type of the HE PPDU. Referring to FIG. 22, the granularity of the TXOP duration of the MU PPDU or the trigger-based PPDU may be set to a value larger than the granularity of the TXOP duration of the SU PPDU or the extended range SU PPDU. The transmission and exchange sequence of the MU PPDU is likely to require a longer TXOP than the transmission of the SU PPDU. Thus, an MU PPDU may use a TXOP duration granularity that is larger than that of an SU PPDU. As shown in FIG. 22, the TXOP duration field of the SU PPDU and/or the extended range SU PPDU may indicate a TXOP duration with a granularity of a short symbol length 13.6 us and the TXOP duration field of the MU PPDU and/or the trigger-based PPDU may indicate a TXOP with a granularity of a long symbol length 16 us, but the present invention is not limited thereto.

According to a further embodiment of the present invention, the granularity of the TXOP duration may be determined by additionally reflecting the CP length used for the corresponding PPDU. For example, if a CP of 0.8 us is used for the PPDU, the granularity of the TXOP duration may be (12.8+0.8) us. The CP length used for the PPDU is obtained from a subfield of HE-SIG-A.

Figure 23:
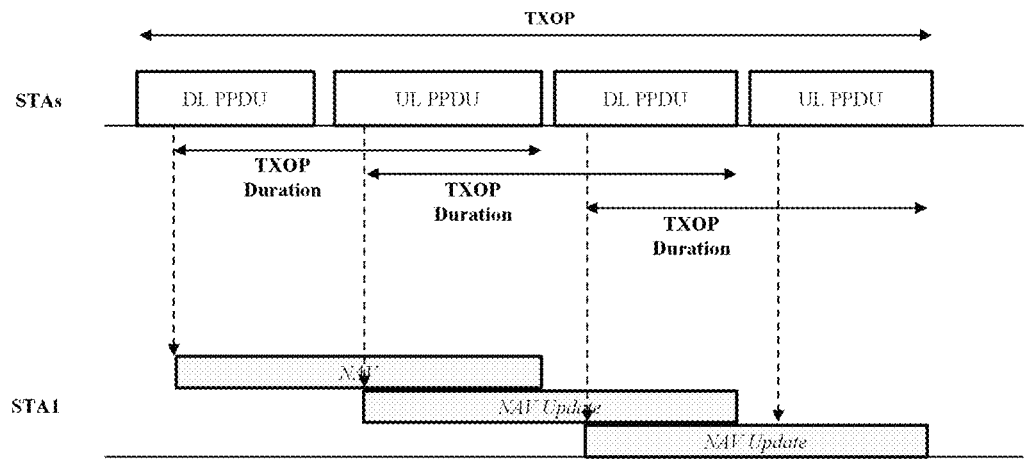
FIGS. 23 and 24 illustrate additional embodiments for setting and updating a NAV based on a TXOP duration value.
Figure 24:
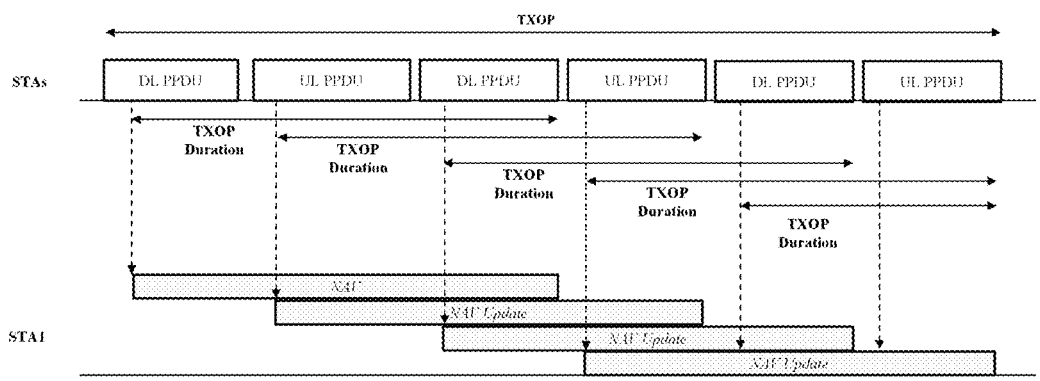

FIGS. 23 and 24 illustrate additional embodiments for setting and updating the NAV based on the TXOP duration value. According to an embodiment of the present invention, the TXOP duration field may not cover the entire TXOP length to be protected. According to the embodiment of FIG. 23, the TXOP duration field may indicate a TXOP duration value up to the transmission completion time of the next PPDU. Also, according to the embodiment of FIG. 24, the TXOP duration field may indicate a TXOP duration value up to the transmission completion time of the next of the next PPDU. However, when the sequences of PPDUs are transmitted within the TXOP, STA1 of the BSS receiving the sequences of PPDUs may continuously set and update a NAV based on the TXOP duration field of the received PPDUs. Thus, the entire sequence of the PPDUs transmitted during the TXOP period can be protected.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
   a processor; and
   a communication unit,
   wherein the processor is configured to:
   receive a trigger frame including resource allocation information, and
   transmit a PHY protocol data unit (PPDU) in a resource unit based on the resource allocation information,
   wherein a bandwidth for transmitting the PPDU comprises a 160 MHz channel or two 80 MHz channels, and
   wherein the resource unit is allocated only in a primary 80 MHz channel except for outside of the primary 80 MHz channel included in the 160 MHz channel or the two 80 MHz channels when the bandwidth for transmitting the PPDU is configured with the 160 MHz channel or the two 80 MHz channels.

2. The wireless communication terminal of claim 1, wherein whether the PPDU is an inter-BSS PPDU or an intra-BSS PPDU is classified according to an intra-BSS condition and an inter-BSS condition.

3. The wireless communication terminal of claim 2, wherein the intra-BSS condition is used to determine whether the PPDU is the intra-BSS PPDU, and wherein the inter-BSS condition is used to determine whether the PPDU is the inter-BSS PPDU.

4. The wireless communication terminal of claim 2, wherein whether the PPDU is the intra-BSS PPDU or the inter-BSS PPDU is classified by a condition of a MAC address among the intra-BSS condition and the inter-BSS condition when the PPDU satisfies both the intra-BSS condition and the inter-BSS condition.

5. The wireless communication terminal of claim 2, wherein whether the inter-BSS condition is satisfied is determined based on a high efficiency(HE)-signal (SIG)-B of the PPDU included in the PPDU, when the PPDU is an HE multi-user (MU) PPDU.

6. The wireless communication terminal of claim 2, wherein whether each of the inter-BSS condition or the intra-BSS condition is satisfied is determined based on whether a value related to an association identifier (AID) included in the PPDU equals to a value assigned by a BSS associated with the base wireless communication terminal.

7. The wireless communication terminal of claim 2, wherein whether each of the inter-BSS condition or the intra-BSS condition is satisfied is determined based on a BSS color of a BSS color field included in a HE-SIG-A when the PPDU includes the HE-SIG-A including the BSS color field.

8. The wireless communication terminal of claim 2, wherein the inter-BSS condition is based on information of a MAC address field of a MAC frame, wherein the intra-BSS condition is based on a BSS color of a BSS color field included in a HE-SIG-A, and wherein the PPDU is determined to inter-BSS PPDU according to the information of the MAC address field of the MAC frame when the PPDU satisfies both the inter-BSS condition by the information of the MAC address field of the MAC frame and the intra-BSS condition by the BSS color of the BSS color field included in the HE-SIG-A.

9. A wireless communication method of a wireless communication terminal, the method comprising:
   receiving a trigger frame including resource allocation information; and transmitting a PHY protocol data unit (PPDU) in a resource unit based on the resource allocation information, wherein a bandwidth for transmitting the PPDU comprises a 160 MHz channel or two 80 MHz channels, and wherein the resource unit is allocated only in a primary 80 MHz channel except for outside of the primary 80 MHz channel included in the 160 MHz channel or the two 80 MHz channels when the bandwidth for transmitting the PPDU is configured with the 160 MHz channel or the two 80 MHz channels.

10. The wireless communication method of claim 9, wherein whether the PPDU is an inter-BSS PPDU or an intra-BSS PPDU is classified according to an intra-BSS condition and an inter-BSS condition.

11. The wireless communication method of claim 10, wherein the intra-BSS condition is used to determine whether the PPDU is the intra-BSS PPDU, and wherein the inter-BSS condition is used to determine whether the PPDU is the inter-BSS PPDU.

12. The wireless communication method of claim 10, wherein whether the PPDU is the intra-BSS PPDU or the inter-BSS PPDU is classified by a condition of a MAC address among the intra-BSS condition and the inter-BSS condition when the PPDU satisfies both the intra-BSS condition and the inter-BSS condition.

13. The wireless communication method of claim 10, wherein whether the inter-BSS condition is satisfied is determined based on a high efficiency(HE)-signal (SIG)-B of the PPDU included in the PPDU, when the PPDU is an HE multi-user (MU) PPDU.

14. The wireless communication method of claim 10, wherein whether each of the inter-BSS condition or the intra-BSS condition is satisfied is determined based on whether a value related to an association identifier (AID) included in the PPDU equals to a value assigned by a BSS associated with the base wireless communication terminal.

15. The wireless communication method of claim 10, wherein whether each of the inter-BSS condition or the intra-BSS condition is satisfied is determined based on a BSS color of a BSS color field included in a HE-SIG-A when the PPDU includes the HE-SIG-A including the BSS color field.

16. The wireless communication method of claim 10, wherein the inter-BSS condition is based on information of a MAC address field of a MAC frame, wherein the intra-BSS condition is based on a BSS color of a BSS color field included in a HE-SIG-A, and wherein the PPDU is determined to inter-BSS PPDU according to the information of the MAC address field of the MAC frame when the PPDU satisfies both the inter-BSS condition by the information of the MAC address field of the MAC frame and the intra-BSS condition by the BSS color of the BSS color field included in the HE-SIG-A.

* * * * *